United States Patent
Koltsidas et al.

(10) Patent No.: US 8,990,502 B2
(45) Date of Patent: Mar. 24, 2015

(54) WRITE CACHE STRUCTURE IN A STORAGE SYSTEM

(75) Inventors: Ioannis Koltsidas, Zurich (CH); Roman Pletka, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 683 days.

(21) Appl. No.: 13/283,967

(22) Filed: Oct. 28, 2011

(65) Prior Publication Data
US 2012/0131265 A1 May 24, 2012

(30) Foreign Application Priority Data
Nov. 23, 2010 (EP) .................................. 10192243

(51) Int. Cl.
*G06F 12/00* (2006.01)
*G06F 12/08* (2006.01)

(52) U.S. Cl.
CPC ........ *G06F 12/0868* (2013.01); *G06F 12/0897* (2013.01); *G06F 2212/225* (2013.01); *G06F 2212/262* (2013.01)
USPC ........................................................ 711/122

(58) Field of Classification Search
CPC .................................................. G06F 12/0897
See application file for complete search history.

(56) References Cited

U.S. PATENT DOCUMENTS

| 6,629,200 | B1 | 9/2003 | Kanamaru et al. |
| 6,948,033 | B2 | 9/2005 | Ninose et al. |
| 2003/0145167 | A1* | 7/2003 | Tomita ........................ 711/114 |
| 2005/0021914 | A1* | 1/2005 | Chung ........................ 711/145 |
| 2006/0230235 | A1 | 10/2006 | O'Connor et al. |
| 2007/0220200 | A1* | 9/2007 | Gill et al. ..................... 711/113 |
| 2008/0104319 | A1 | 5/2008 | Hu et al. |

FOREIGN PATENT DOCUMENTS

| EP | 1739560 A2 | 1/2007 |
| JP | 2001-117817 | 9/2004 |

OTHER PUBLICATIONS

Gill, B., et al., "WOW: Wise Order Writes—Combining Spatial and Temporal Locality in Non-Volatile Caches," FAST 2005.
Corbato, F. J., "Paging Experiment With The Multics System," In Honor of P. M. Morse, pp. 217-228, MIT Press, 1969.

* cited by examiner

*Primary Examiner* — Baboucarr Faal
(74) *Attorney, Agent, or Firm* — Cantor Colburn LLP (57) ABSTRACT

A method of writing data units to a storage device. The data units are cached in a first level cache sorted by logical address. A group ($G^j$) of sorted data units is transferred from the first level cache to a second level cache embodied in a solid state memory device. Data units of multiple groups ($G^j$) are sorted in the second level cache by logical address. The sorted data units stemming from the multiple groups are written to the storage device.

11 Claims, 3 Drawing Sheets

WRITE CACHE STRUCTURE IN A STORAGE SYSTEM

CROSS-REFERENCE TO RELATED APPLICATIONS

This application claims priority under 35 U.S.C. §119 to European Patent Application No. 101992243.3 filed Nov. 23, 2010, the entire content of which is specifically incorporated by reference herein.

BACKGROUND OF THE INVENTION

1. Field of the Invention

The present invention generally relates to a method of writing data to a storage device, a related computer program product, and to a storage controller. In particular, the present invention relates to a write cache structure for a storage system including a non-volatile solid state memory device such as a flash memory device.

2. Description of Related Art

Conventional storage systems for enterprise applications typically include arrays of hard disk drives as storage device. A storage controller of the storage system manages operations on the storage device, including organizing and executing read and write operations. Another task of such storage controller refers to caching, i.e. temporarily storing a limited amount of data units frequently being accessed in a combined read and write cache, or in separate read and write caches which caches mostly are embodied as volatile dynamic random access memories (DRAMs). As is widely known, DRAM memory caching technology is characterized by fast access times resulting in high bandwidth on the one hand, and by limited storage capacity compared to the destination storage device on the other hand. Many caching strategies envisage that frequently used data are deposited in a read cache in order to avoid for each read request for such data to access the slower storage device. The main purpose of a write cache is to hide the latency of a slower storage device and to decouple write operations to the storage device from new write or read requests received which write operations can otherwise block or slow down serving the new write or read requests or any other operations. As a result, a write cache allows to temporarily deposit data units therein and to later transfer these data units to the storage device for permanent storage. Further it allows reducing the number of writes to the storage devices if the same data is updated frequently.

Even if the timing of writing data units to the storage device now can be controlled as the data units wait to be destaged from the write cache, still, any write operation from the write cache to the storage device can prevent the storage device from performing other tasks in the meantime. For example, when data units are written from the write cache to a hard disk drive, a write head of the hard disk drive needs to be positioned prior to writing the data to its destination during which time the hard disk drive cannot be used for read. In this sense, it is critical for the overall performance of a storage system to implement a strategy that allows an efficient operation of the write cache.

In "WOW: Wise Order Writes—Combining Spatial and Temporal Locality in Non-Volatile Caches", by Binny Gill and Dharmendra Modha, FAST 2005, 4th Usenix Conference on File and Storage Technologies, a write cache mechanism is introduced, in which a sorted list of write groups is maintained. The smallest and the highest write groups are joined forming a circular list. A "recency" bit is maintained with each write group. The algorithm now proceeds as follows. A write group is always inserted in its correct sorted position. Upon insertion, its recency bit is set to zero. However, on a write hit, the recency bit is set to one. The destage operation proceeds wherein a destage pointer is maintained that traverses the circular list looking for destage victims. Every write group that is encountered is eventually destaged where only valid data units have to be transferred. However, it is only allowed to destage write groups whose recency bit is zero. The write groups with a recency bit of one are skipped; however, their recency bit is turned off, and reset to zero. The basic idea is to give an extra life to those write groups that have been hit since the last time the destage pointer visited them. This allows to incorporate recency representing temporal locality on one hand, and small average distance between consecutive destages representing spatial locality on the other hand.

In US2003/0140198, a computer system is proposed with a plurality of levels of cache storage, a cache control method prevents data duplication among the levels of cache storage to increase cache storage utilization. A high-level cache staging unit stages reads data from a disk unit, stages the data to a high-level cache, and instructs to destage the data, which has been read, from a low-level cache. A high-level cache destaging unit writes data to be destaged to the disk unit, instructs to stage the data, which has been written, to the low-level cache, and destages the data from the high-level cache. A low-level cache staging unit stages data, which is written by the high-level cache destaging unit, to the low-level cache. A low-level cache destaging unit destages data, which is instructed by the high-level cache staging unit, from the low-level cache.

SUMMARY OF THE INVENTION

According to a first aspect of the present invention, a method is provided for writing data units to a storage device. The data units are cached in a first level cache sorted by logical address. A group of sorted data units is handed over from the first level cache to a second level cache embodied in a solid state memory device. The data units of multiple groups in the second level cache are sorted by logical address and the sorted data units of the multiple groups is written to the storage device.

In embodiments, the method can include one or more of the following features:
- the group of sorted data units to be handed over to the second level cache is selected from the sorted data units in the first level cache according to the time passed since the most recent usage of such data unit;
- the first level cache is organized as an ordered list wherein the data units are sequentially cached in cells of the ordered list according to the logical address,
- each data unit stored in one of the cells is associated with a flag for indicating an update of the data unit since it has been stored in the cell, and
- the group of data units to be destaged/handed over to the second level cache is formed by selecting all data units not indicating such update;
- the ordered list is organized as a ring structure;
- the data units of the k oldest groups of data units residing in the second level cache is sorted by logical address and written to the storage device;
- the data units of the multiple groups to be written to the storage device are sorted by logical address by means of a heap data structure;
- the storage device includes hard disk drives organized in a Redundant Array of Independent Disks, and each data unit is written as a stripe to the Redundant Array of Independent Disks;
the second level cache is organized in blocks, e.g., data segments with fixed-size,
the size of a data unit is smaller than or equal to the size of a block, and
by handing over the group of sorted data units to the second level cache each data unit of the group is written to a separate block of the second level cache;
the second level cache is organized in blocks,
wherein the size of a data unit exceeds the size of a block, and
wherein by handing over the group of sorted data units to the second level cache each data unit is written to a multiple different blocks of the second level cache;
a mapping table is provided for mapping logical addresses of data units to physical addresses of blocks the data units reside in the second level cache;
a mapping table is provided for mapping physical addresses of blocks the data units reside in the second level cache to the logical addresses of these data units;
when caching a new data unit in the first level cache it is verified if this new data unit represents an update to a data unit currently residing in the second level cache by means of comparing the logical address of the new data unit to the logical addresses of the data units residing in the second level cache, and
if the new data unit is found to be an update of a data unit currently residing in the second level cache such data unit is invalidated and optionally removed from the second level cache without writing it to the storage device;
wherein the removal of a data unit from the second level cache due to an update of a data unit is handled by an update of the mapping table, and
wherein the block is removed from the second level cache when all still valid data units in that block have been written to the storage device.

According to another aspect of the present invention, a computer program product is provided including a computer readable medium having computer readable program code embodied therewith, the computer readable program code including computer readable program code configured to perform a method according to any one of the above embodiments.

According to a further aspect of the present invention, a storage controller is provided, including a cache structure including a first level cache and a second level cache, the second level cache being embodied in a solid state memory device, and a processing unit adapted to cache received data units in the first level cache sorted by logical address, hand over a group of sorted data units from the first level cache to the second level cache, sort the data units of multiple groups in the second level cache by logical address, and write the sorted, yet valid data units of the multiple groups to a storage device.

In embodiments, the method can include one or more of the following features:
the first level cache is embodied in a volatile random access memory, and the second level cache is embodied in a non-volatile solid state memory device;
the first level cache is embodied in a dynamic random access memory, and the second level cache is embodied in a flash memory device.

It is understood that method steps can be executed in a different order than listed in a method claim. Such different order shall also be included in the scope of such claim as is the order of steps as presently listed.

Embodiments described in relation to the aspect of the method shall also be considered as embodiments disclosed in connection with any of the other categories such as the device, the computer program product, etc.

Other characteristics and advantages of the invention will become obvious in combination with the description of accompanying drawings, wherein the same number represents the same or similar parts in all figures.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

DETAILED DESCRIPTION OF THE PREFERRED EMBODIMENTS

As an introduction to the following description, it is first pointed at a general aspect of the invention. The basic principle of the invention is based on a two level write cache structure in which data units to be stored in a storage system are transferred into the write cache structure prior to being written to the storage device. In such approach, data units to be written to the storage device are first written to a first level cache which in a hierarchy of the write cache structure represents the top level cache. The data units are temporarily stored there. The data units are deposited in the first level cache in an ordered way, i.e. sorted by logical address. The logical address is the address by which a host interacting with the storage system addresses the data units. The logical address is different from the physical address which the storage device uses when operating on data units. The data units in the first level cache are preferably sorted by ascending logical address. However, alternatively, the data units can be sorted by descending logical address, or in another predefined order. The routine of caching the data units in the first level cache sorted by logical address can include storing a data unit first and sorting multiple of stored data units afterwards, or inserting a data unit at a position amongst other stored data units which position reflects the value of the logical address relative to the values of the logical addresses of the other data units stored. The sorted data units can not necessarily be stored in sequential cells/blocks of the first level cache, however, when such data units are not stored in sequential cells/blocks a data structure can be provided for identifying an order of the data units.

Some or all of the data units stored in the first level cache are transferred/handed over/destaged to a second level cache at a certain point in time, which second level cache is a lower level cache of the write cache structure. This step includes writing the data units to the second level cache and having them stored there temporarily, and, if not erasing or rewriting such data units from the first level cache immediately, at least allowing these data units to be erased or rewritten upon receipt of new data units. As such, the two level cache design follows a concept that a data unit residing in the write cache structure can either reside in the first level cache or in the second level cache, such that when a data unit is received from a host it needs to travel the first level cache first and the second level cache second before leaving the second level cache for being written to the storage device. As a result, a data unit typically is not stored in both of the first and the second level cache at the same point in time except that a new update to such data unit is received while the outdated data unit still resides in the second level cache.

The multitude of data units that are transferred from the first level cache to the second level cache as an entity is called a group of data units. A group can include all the data units stored in the first level cache, or can include only a selected subset of data units currently stored in the first level cache. In a preferred embodiment, the first level cache can be organized as a ring structure, the data units of which ring structure are sequentially verified for fulfilling a criterion for being transferred. In such scenario, all the data units selected during a single round of verification forms a group of data units to be transferred to the second level cache. The actual transfer does not need to be accomplished in parallel. The data units forming a group can also be transferred sequentially. It is noted, that for the reason that in the first level cache the data units are sorted by logical address, the group transferred to the second level cache is also sorted by logical address.

A criterion for selecting data units for forming a group can reflect a temporal locality between those data units. In a preferred embodiment, the circular list of data units in the first level cache is sorted according to the logical block address of these data units. A new data unit can be inserted in sorted order. Each data unit in the first level cache can advantageously represent a RAID stripe provided the underlying storage device includes a Redundant Array of Independent Disks (RAID). In addition, a flag can be assigned to each data unit in the first level cache. Upon insertion of a new data unit in the first level cache the assigned flag is set to zero. However, whenever the data unit is used e.g. for being updated or for supporting reading requests, the flag is set to one. For transferring data units from the first level cache to the second level cache a destage pointer is maintained that traverses the circular list looking for selecting data units to be destaged. Such destage pointer also known as "clock hand" can advance in ascending logical address order. Data units with a flag of value one representing data units recently used are skipped. However, the flag of those data units can be reset to zero for the next clock round. This allows for destaging those data units that have not been used recently, e.g. during the previous clock round. By only selecting pages that have a flag value of zero, the algorithm guarantees that only the least recently used pages will be destaged, i.e. transferred to the second level cache. By first having sorted the data units according to their logical address a small average distance is achieved between consecutive data units to be destaged representing a spatial locality between those data units which results in a nearly sequential writing pattern which in turn is favoured to any underlying storage device that benefits from sequential writes, such as disks or tapes do. For those storage systems, the time required for positioning the write head relative to the destination on the storage medium is minimized when it can be started from a near by location, which is the case when the data units are written in a nearly sequential logical address order.

In the second level cache, the received group of data units is stored. In case of a flash memory data units are stored in one or more erase units (i.e., flash blocks) of the second level cache where an erase unit can hold data from a single or a small set of groups. There can already be other groups of data units residing in the second level cache. For finally writing data units residing in the second level cache to the storage device, the data units of multiple groups are sorted by logical address. This plurality of data units then is transferred to the storage device such that the storage device receives the data units for writing in a sorted way, e.g. sorted in ascending order of the logical address, or sorted in descending order of the logical address, or a first portion of data units being sorted in ascending order of logical address and a second portion of data units being sorted in descending order of logical address. As such, the overall sequence of data units written to the storage medium results in the least possible movement between the write head and the storage medium, and as such in a fast write time. At the same time, an erase unit has no longer valid data if all groups that have stored valid data units in that erase unit have been destaged. It can then just be erased without needing to relocate any data.

The second level cache is embodied as a solid state memory device. Solid-state memory devices encompass rewritable non-volatile memory devices which use electronic circuitry for storing data. Examples of solid state memory devices include flash memory devices, phase change memory devices or magnetic RAM memory devices. Currently, volatile random access memories (RAM), and in particular dynamic random access memory DRAM devices are used as a write cache. For the reason that DRAMs are volatile, such write caches need to be battery backed in order not to lose data that still needs to be written to the storage device in case of a power down of the storage controller. In addition, DRAM is more expensive and as a result limited in size for write cache applications. For this reason, for example, a NAND flash memory device used as a write cache can be an order of magnitude larger in capacity than a DRAM cache and thus provides extended capacity for accepting new write requests, and, if being scanned in connection with read requests, can provide a higher hit ratio, too. In addition, the NAND flash memory device is non-volatile by nature and does not need to be battery backed. Although flash memory devices are more expensive than hard disk drives, they are faster to access and consume significantly less energy.

For the reason that the write cache structure is hierarchical, the second level cache can easily be added to existing systems in which the conventional DRAM write cache is not replaced but now is used as first level cache, and is extended by the flash memory device which is used as a second level cache. The existing DRAM size can also be reduced in view of the underlying flash memory device used as second level cache in order to reduce the emergency power supply means in form of batteries needed for backing the DRAM. In a very preferred embodiment, the first level cache is embodied in DRAM, the second level cache is embodied in a flash memory device, and the underlying storage system includes an array of hard disk drives.

However, the first level cache can be implemented as a solid state memory device, too, such as a NAND flash memory device, and as such can be embodied in the same technology as the second level cache, and, more specifically, can even be embodied in the same physical device as the second level cache. Still, the caching mechanism is implemented as a two tier approach wherein received data units are cached first in a sorted way in a first portion of a flash memory device. A group of sorted data then is transferred to a second portion of a flash memory device, and the data units of multiple groups residing in the second portion are first sorted and then written to the storage device. The number of writes can be further reduced by updating meta-data instead of writing data units to a new location and using a garbage collector to reclaim flash blocks. Such implementation of the write cache structure would not need any redundant power supply such as batteries. In such embodiment, the flash controller can include all control functionality such that no additional processing unit can be required.

In the figures, same or similar elements are denoted by the same reference signs.

Figure 1:
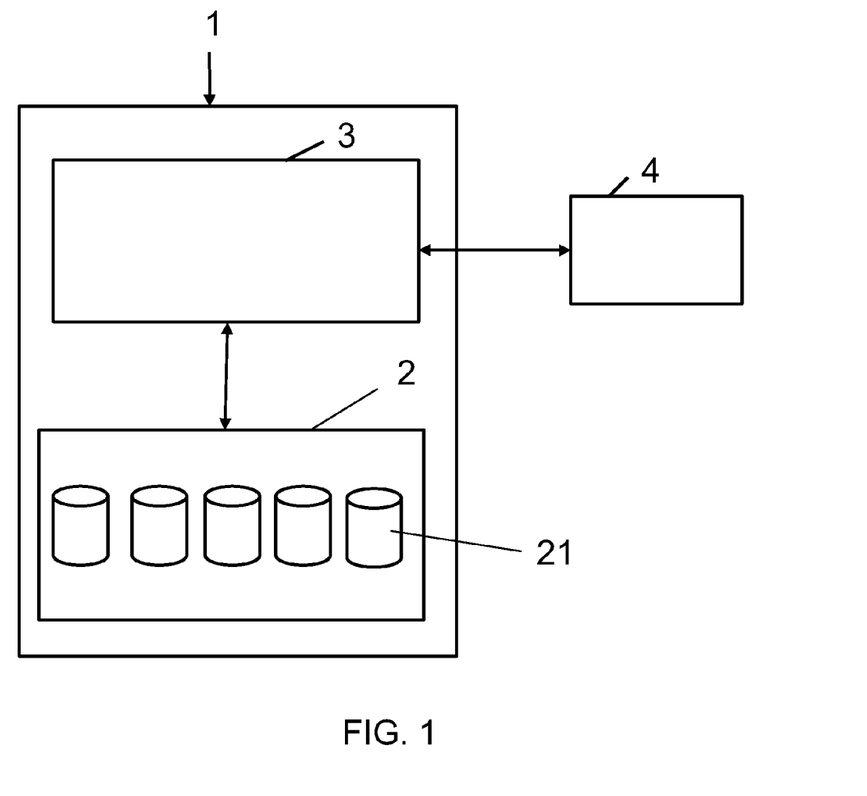
FIG. 1 illustrates a block diagram of a storage system according to an embodiment of the present invention.

FIG. 1 shows a block diagram of a storage system according to an embodiment of the present invention. The storage system 1 includes a storage device 2 and a storage controller 3 for controlling operations on the storage device 2, and in particular for writing data units to and reading data units from the storage device 2 including executing all administrative tasks in connection with the reading and writing of data. A storage system might also include more than one storage controller for reliability or performance reasons. The storage controller 3 further is connected to one or more hosts 4 which make use of the storage device 2 for storing data. Hence, the host 4 issues read and/or write commands to the storage system 1. The storage device 2 includes multiple hard disk drives 21, only a few of which are illustrated in FIG. 1. The hard disk drives 21 preferably are arranged in one or more Redundant Arrays of Independent Disks, abbreviated as RAID. This technology basically provides a fail safe strategy for at least one of the disk drives by either redundantly storing the data units and corresponding error correction codes in multiple disk drives, or by splitting each data unit including the corresponding error correction code into elements and spreading such elements over multiple disk drives. A data unit split in such way and distributed across multiple disk drives is also called a stripe.

Figure 2:
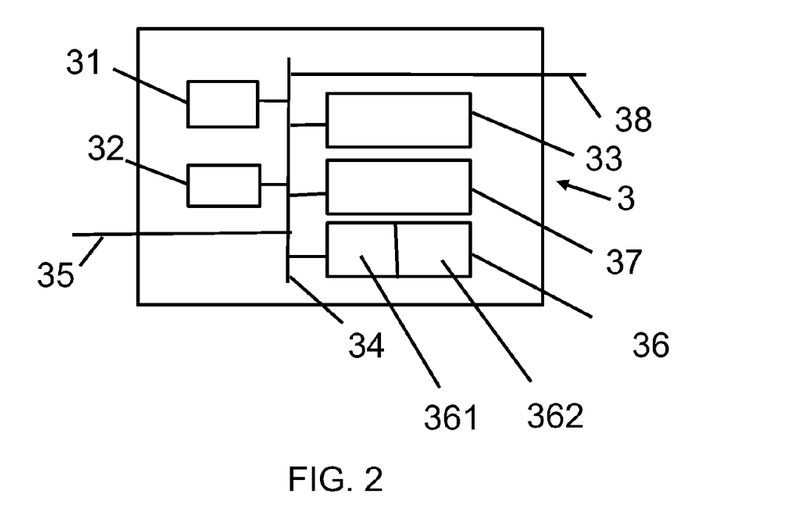
FIG. 2 illustrates a block diagram of a storage controller according to an embodiment of the present invention.

FIG. 2 schematically depicts a block diagram of the storage controller 3 of FIG. 1. In order to implement any method according to any one of the embodiments of a method as described below, the storage controller 3 preferably provides a computer program code preferably stored in a non-volatile, non-rewritable memory portion such as in a read only memory ROM 31. The storage controller 3 further provides a random access memory RAM 32 for loading the program code into, and a processing unit 33 for executing the program code in the RAM 32. In addition, a write cache structure 36 is provided, and a separate read cache 37. The write cache structure 36 includes a first level cache 361 and a second level cache 362. The second level cache 362 in the present example is embodied as a flash memory device. However, the second level cache 362 can also be embodied in another non-volatile memory technology, such as in a phase change memory device or in a magnetic RAM device. The first level cache 361 in the present example is embodied in a dynamic random access memory DRAM device. The first-level write cache 361 in the present example can physically be realized as a part of the random access memory 32 of the storage controller 3. The read cache 37 can be realized as a dynamic random access memory DRAM device and can also be physically realized as a part of the random access memory 32 of the storage controller 3.

In addition, internal communication systems 34 are provided for communicating between the components of the memory controller 3, and an interface 35 is provided for communicating with the storage device, while another interface 38 can be provided for communicating with the host. The internal communication systems 34 can further include dedicated communication systems for meta-data and data units.

Figure 3:
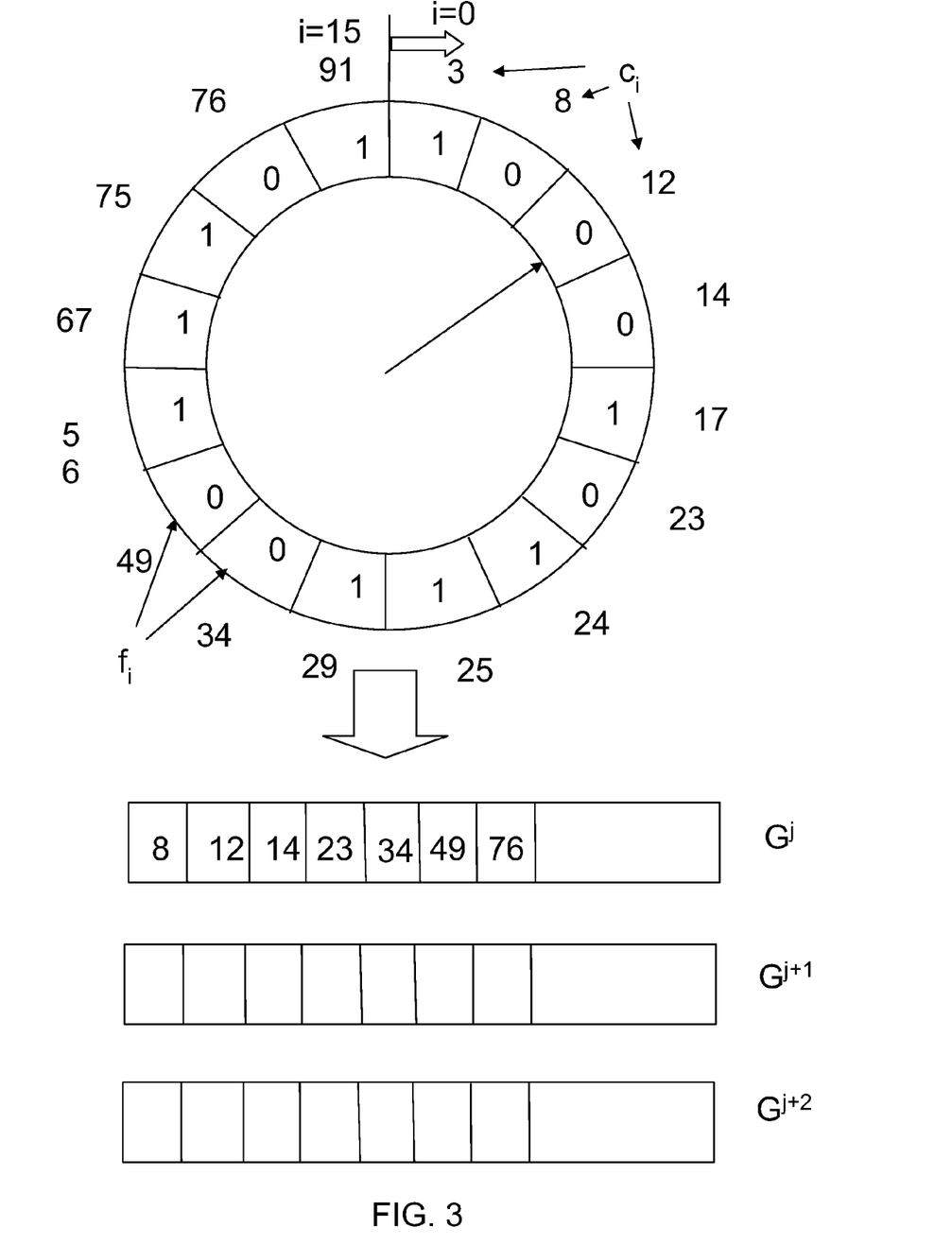
FIG. 3 is a diagram illustrating operations with respect to a first level cache according to an embodiment of the present invention.

FIG. 3 shows a diagram illustrating operations with respect to a first level cache according to an embodiment of the present invention. In the present example, the two level write cache structure includes a first level cache 361 implemented in DRAM technology, and a second level cache implemented in flash memory technology. In a preferred embodiment, the algorithm applied with respect to the first level cache 361 in DRAM selects the data units to be transferred to the second level cache according to a temporal and a spatial locality of the data units in an ordered way.

The present first level cache 361 is organized as a ring structure, also known as circular list. Its cells $c_i$ are ordered in a sequential way forming a ring. Presently, there are sixteen cells arranged in the ring, $c_0$ to $c_{15}$ building the set $C^j$ where i corresponds to the index in the circular list and j to the current group being handled. As presently shown, each cell $c_i$ holds a data unit identified by its logical address. Starting at the noon position in the ring structure and following the direction of the arrow, data units with logical addresses 3, 8, 12, 14, etc. are presently stored in the first level cache 361.

A flag $f_i$ is associated with each cell $c_i$. The value assigned to the flag $f_i$ can be either zero or one wherein the one can indicate that any usage of the data unit in the associated cell $c_i$ has occurred since the data unit has been written into the first level cache 361 or since the previous clock round. The zero can indicate that no such usage of the data unit in the associated cell $c_i$ has occurred since the data unit has been written into the first level cache 361 or since the previous clock round. A usage of a data unit can encompass an update to such data unit or a read request being successfully served by the data unit.

In the present embodiment, a virtual pointer also denoted as "clock hand" is illustrated in the diagram of FIG. 3 and can start turning from the noon position clock-wise for a full clock round back to the noon position. In the present embodiment, all data units stored in cells $c_i$ are selected for a group to be transferred to the second level cache which corresponding flags $f_i$ indicate that the data unit was not used recently, i.e., in the present example where $f_i=0$. All such data units selected during one clock round of the clock hand form a group $G^j$ to be destaged to the second level cache.

Given that the data units are already stored in a sorted manner in the first level cache 361, e.g., according to ascending logical addresses, the least recently used data units are destaged to the second level cache, where the selected group is ordered by logical address. As such, a group contains data units selected during a single clock round in a sorted order. For a clock round j starting at the noon position and ending there, the group $G^j$ is formed by:

$$G^j = \{x_i \in C^j | f_i = 0\}$$

The data units selected into the group $G^j$ is depicted underneath the ring structure in FIG. 3. When the next clock round begins, the present group $G^j$ is closed and is transferred to the second level cache, i.e. the flash memory device in the present example, and a new group $G^{j+1}$ is opened for that round. When the new group $G^{j+1}$ is closed, it can be transferred to the second level cache, too.

Figure 4:
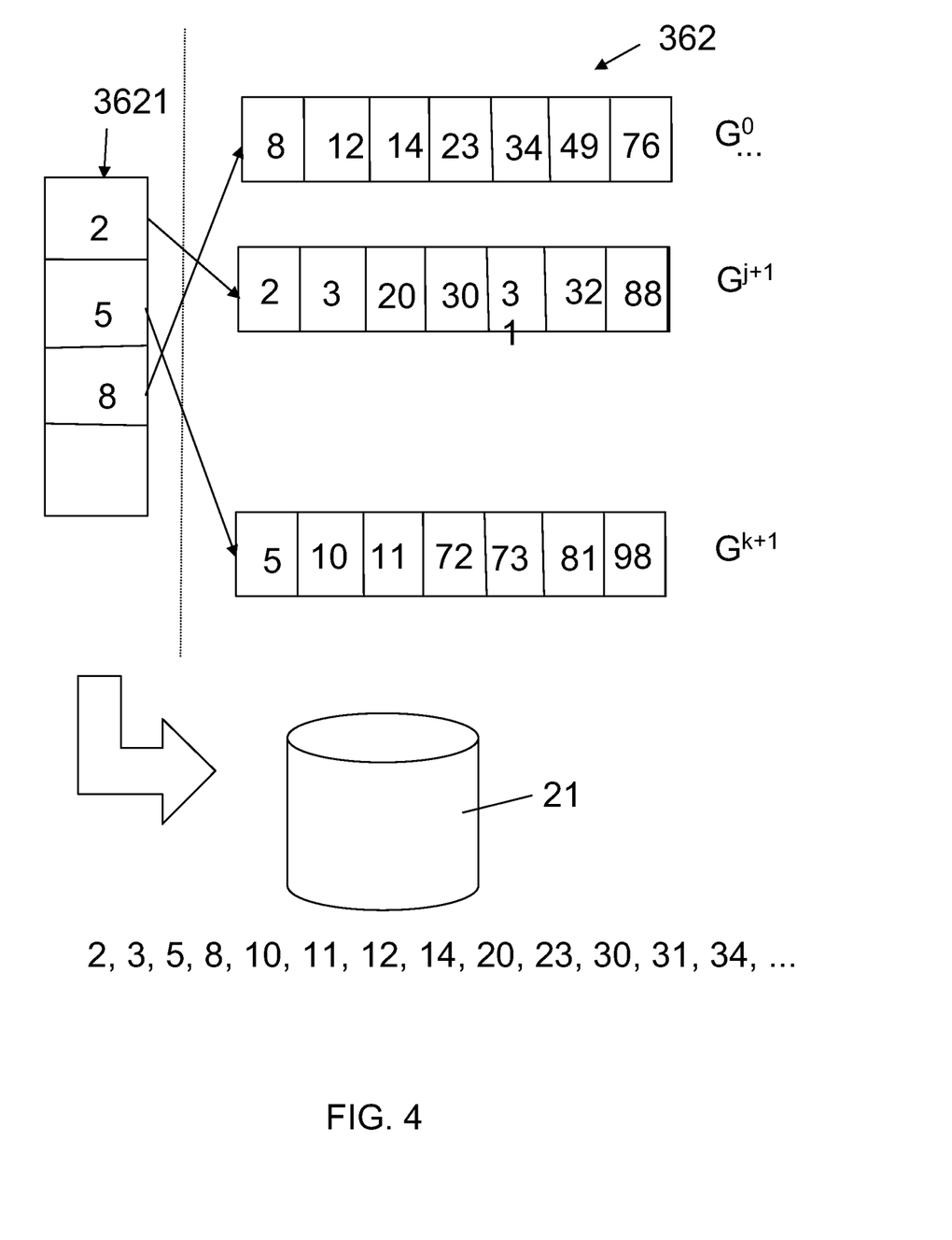
FIG. 4 is a diagram illustrating operations with respect to a second level cache according to an embodiment of the present invention.

An embodiment of a second level cache 362 is depicted in FIG. 4. Multiple groups of data units $G^0$, $G^{j+1}$, $G^{k-1}$ that were handed over from the first level cache are now residing in the second level cache 362. Note that the start and the end of a clock round, which is equivalent to the beginning and the end of a group, can be either explicitly indicated, for example, by providing designated storage locations for the beginning of a group, or by providing some flag for indicating the beginning of a group, or can be implicitly detected by observing the sequence of logical addresses. Since all groups transferred to the second level cache are sorted by, e.g. ascending logical address, the beginning of a new group can be identified whenever out of two successive data units the latter one shows a logical address lower than the previous one.

After a certain time all existing k groups, or, alternatively, when k groups of data units are stored in the second level cache, or, alternatively, at a certain point in time identifying the k oldest groups of data units, then a transfer of the data units of the k groups to the storage device is initiated. For the reason that such transfer shall be performed in an ordered way, e.g., by ascending logical address, the data units of the identified groups to be transferred are sorted first, e.g., by ascending logical address.

For example, when k groups of data units have been identified out of the groups residing in the flash memory device, the data units of these selected groups can be destaged to the hard disks 21 by merging the sorted groups of data units. For an efficient merging, it can be advantageous to use a heap data structure of size k which is used as a minimum priority queue. Such heap structure is denoted in FIG. 4 by reference numeral 3621. Each item in the heap structure 3621 corresponds to one data unit out of the k groups being merged: At each point in time, the heap structure 3621 holds the data unit with the least logical address from each group that has not yet been written to the disks 21. Each time a data unit out of the heap structure 3621 is written to the disks 21, e.g., the data unit with the least logical address, it is replaced in the heap structure 3621 by the next data unit from the group the written data unit belonged to. Eventually, all data units will be written in ascending logical address order. Such queue of data units 2, 3, 5, 8, 10, etc. is illustrated at the bottom of the diagram of FIG. 4 for being written to the symbol 21 representing a hard disk, a Redundant Array of Independent Disks, or any other type of hard disk system.

In one embodiment, the sorted groups $G^j$ of flash blocks correspond to physically contiguous flash blocks in the flash memory device. In another embodiment, physically non-contiguous blocks can simply be allocated to blocks of a sorted group such block holding data units sorted along a criterion. Further, a set of flash blocks from different flash chips or planes can be used to store data units of a sorted group where the sorted data units are stored in parallel in a round-robin fashion. Namely, the first data unit would be stored on the first page of the flash block of the first plane or chip, the second data unit on the first page of the flash block of the second plane or chip, and so on. In case a sorted group doesn't fill up the flash blocks to which the current group has been stored, another group can be stored later in the remaining free flash pages in the same round robin fashion.

The above approaches are in particular beneficial when the second level cache is a flash memory device and the storage device includes hard disks. Since a flash memory device typically includes a flash controller for controlling operations on the flash cells, such flash controller can be enabled to initiate the transfer of flash blocks to the hard disks in k group batches, by merging the k oldest groups in the flash memory first. Writes to the hard disks are done in an ordered way which results in a favourable write pattern for the reason that sequentially writing data to disk results in only little movement of the write head. The access pattern to the disks now corresponds to the case of using a DRAM-only write cache of size n*k with n being the group size and k being the group batch size.

A flash memory device is organized in blocks and pages with a block including of multiple pages. The smallest unit for reading and writing data units is a page, while the smallest unit for erasing operations is a block. In case the second level cache is embodied as a flash memory device, in one preferred embodiment the size of a data unit is a multiple of the size of a flash page or a flash block. Accordingly, in FIG. 4 each data unit 8, 12, 14, of group $G^0$ for example, is written to a separate page or block in flash. I.e., each data unit fits into an individual page or block in flash. In case the data unit fits into a page, this is a preferred design in connection with flash technology for the reason that only full pages are written and transferred. It is noted that writing sequentially to flash blocks together with destaging groups in the order of their arrival ensures that no write amplification owed to writes out of place occurs. This, in turn, improves the performance and the lifetime of the flash memory device.

On the other hand, when the underlying storage system is embodied as a Redundant Array of Independent Disks RAID according to an embodiment of the present invention, in which elements of a data unit are spread across multiple disks in form of a stripe, then a data unit preferably represents such stripe with respect to the underlying storage device. In such sense, a data unit can represent a stripe with respect to a RAID system of the storage device, and can preferably fit into a block of the second cache level flash memory. However, in other embodiments, a RAID stripe and the data unit representing a RAID stripe can be any multiple of the flash block size or, the other way round, multiple RAID stripes forming either a single or multiple data units can map into a single flash block. Data units from one RAID stripe can be stored in parallel on flash blocks in different flash chips or planes in a round-robin manner. In case a RAID stripe doesn't fill up the flash blocks to which the current RAID stripe has been stored, another RAID stripe can be stored later in the remaining free flash pages in the same round robin fashion.

In the above embodiment, the conventional logical-to-physical address mapping table in a flash memory device can be replaced by a mapping from RAID stripes to physical block locations on the flash memory device. In such an embodiment, the logical address of a data unit is set to a RAID stripe identifier assuming that the size of a RAID stripe can be equal to or a multiple of the physical flash block size. In a different embodiment, multiple RAID stripes can map into a single data unit with a single logical address, which data unit can map into a single block in flash. Here, a mapping for identifying the RAID stripes within the data unit can preferably be provided. Alternatively, ranges of RAID stripes can be mapped to multiple logical blocks.

There can also be maintained a reverse map for mapping physical addresses of blocks of the flash memory device to RAID stripes. As both mapping tables are maintained at the block level, both mapping tables can be stored in a DRAM of the flash memory device controller consuming only about 0.0015% of the flash space assuming a block holds 128 pages in such flash memory device.

In a preferred embodiment of the present invention, upon receiving a new data unit in the first level cache it is verified if this new data unit represents an update to a data unit currently residing in the second level cache. Preferably, the logical address of the new data unit is compared to the logical address of one or more data units residing in the second level cache. In case the new data unit is found to be an update of a data unit currently residing in the second level cache such data unit is removed from the second level cache without writing it to the storage device. Hence, the system is prevented from writing already outdated data to the storage device. Note that the removal can be implicitly given by removing or updating the logical-to-physical address mapping table and/or the reverse map. This is advantageous in case multiple data units or RAID stripes are stored in the same flash block as erasing a single data unit would cause write amplification.

As will be appreciated by one skilled in the art, aspects of the present invention can be embodied as a system, method or computer program product. Accordingly, aspects of the present invention, in particular in form of the controller, can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention, such as the read and write methods, can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

That which is claimed:

1. A method of writing data units to a storage device, the method comprising:
caching the data units in a first level cache by logical address to form sorted data units in the first level cache;
handing over a group ($G^j$) of the sorted data units in the first level cache to a second level cache embodied in a solid state memory device to form a group of data units residing in the second level cache, wherein the second level cache is organized in blocks, a size of the data unit is not larger than a size of the block, wherein by handing over the group ($G^j$) of sorted data units to the second level cache, each data unit of the group ($G^j$) is written to a separate block of the second level cache;

sorting, by logical address, data units of multiple groups ($G^j$) residing in the second level cache to form sorted data units of the multiple groups;

providing a mapping table to the logical address of the data units to a physical address of the block the data units residing in the second level cache; and writing the sorted data units of the multiple groups to the storage device;

when caching a new data unit in the first level cache, verifying whether the new data unit represents an update to a data unit currently residing in the second level cache by comparing a logical address of the new data unit to the logical addresses of the data units residing in the second level cache; and in the event the new data unit is found to be the update of the data unit currently residing in the second level cache, invalidating the data unit currently residing in the second level cache;

wherein the removal of the data unit currently residing in the second level cache from the second level cache due to the update of the new data unit is handled by a mapping table update; and wherein the block is removed from the second level cache when all still valid data units in the block have been written to the storage device.

2. The method according to claim 1, wherein the group ($G^j$) of the sorted data units to be handed over to the second level cache is selected from the sorted data units in the first level cache according to the time passed since usage of the sorted data unit in the first level cache.

3. The method according to claim 1,
wherein the first level cache has an ordered list structure comprising cells ($c_i$),
wherein each of the data units is sequentially cached in one of the cells ($c_i$ by logical address;
wherein each data unit stored in one of the cells ($c_i$) is associated with a flag ($f_i$) for indicating an update of the data unit since it has been stored in the cell ($c_i$); and
wherein the group ($G^j$) of sorted data units to be handed over to the second level cache is formed by selecting all data units not indicating the update.

4. The method according to claim 3, wherein the ordered list is organized as a ring structure.

5. The method according to claim 1, wherein the data units of a "k" number of oldest groups ($G^j$) of data units residing in the second level cache are sorted by logical address and written to the storage device.

6. The method according to claim 1, wherein the data units of the multiple groups ($G^j$) to be written to the storage device are sorted by logical address by means of a heap data structure.

7. The method according to claim 1,
wherein the storage device comprises hard disk drives organized in a Redundant Array of Independent Disks; and
wherein each data unit is written as a stripe to the Redundant Array of Independent Disks.

8. A non-transitory computer readable storage medium having computer readable instructions stored thereon which, when implemented, cause a computer to implement a method of writing data units to a storage device, the method comprising:

caching the data units in a first level cache sorted by logical address;

handing over a group ($G^j$) of the sorted data units from the first level cache to a second level cache embodied in a solid state memory device to form a group of data units residing in the second level cache, wherein the second level cache is organized in blocks, a size of the data unit is not larger than a size of the block, and by handing over the group ($G^j$) of sorted data units to the second level cache each data unit of the group ($G^j$) is written to a separate block of the second level cache;

sorting data units of multiple groups ($G^j$) in the second level cache by logical address;

providing a mapping table to the logical address of the data units to a physical address of the block the data units residing in the second level cache;

writing the sorted data units of the multiple groups to the storage device;

when caching a new data unit in the first level cache, verifying whether the new data unit represents an update to a data unit currently residing in the second level cache by comparing a logical address of the new data unit to the logical addresses of the data units residing in the second level cache; and in the event the new data unit is found to be the update of the data unit currently residing in the second level cache, invalidating the data unit currently residing in the second level cache;

wherein the removal of the data unit currently residing in the second level cache from the second level cache due to the update of the new data unit is handled by a mapping table update; and wherein the block is removed from the second level cache when all still valid data units in the block have been written to the storage device.

9. A storage controller, comprising:
a write cache structure comprising a first level cache and a second level cache, the second level cache being embodied in a solid state memory device; and
a processing unit adapted to:
cache received data units in the first level cache sorted by logical address;
hand over a group ($G^j$) of sorted data units from the first level cache to the second level cache, sort the data units of multiple groups ($G^j$) in the second level cache by logical address to form a group of data units residing in the second level cache, wherein the second level cache is organized in blocks, a size of the data unit is not larger than a size of the block, wherein by handing over the group ($G^j$) of sorted data units to the second level cache, each data unit of the group ($G^j$) is written to a separate block of the second level cache;
provide a mapping table to the logical address of the data units to a physical address of the block the data units residing in the second level cache;
write the sorted data units of the multiple groups ($G^j$) to a storage device when caching a new data unit in the first level cache, verifying whether the new data unit represents an update to a data unit currently residing in the second level cache by comparing a logical address of the new data unit to the logical addresses of the data units residing in the second level cache; and in the event the new data unit is found to be the update of the data unit currently residing in the second level cache, invalidating the data unit currently residing in the second level cache;

wherein the removal of the data unit currently residing in the second level cache from the second level cache due to the update of the new data unit is handled by a mapping table update; and wherein the block is removed from the second level cache when all still valid data units in the block have been written to the storage device.

10. The storage controller according to claim 9, wherein the first level cache is embodied in a volatile random access memory, and wherein the second level cache is embodied in a non-volatile solid state memory device.

11. The storage controller according to claim 10, wherein the first level cache is embodied in a dynamic random access memory, and wherein the second level cache is embodied in a flash memory device.

* * * * *